United States Patent [19]
Pando

[11] 3,983,483
[45] Sept. 28, 1976

[54] COMMUNICATIONS DEVICE ARRANGED TO BE WORN IN INTIMATE CONTACT WITH THE BODY OF A USER

[76] Inventor: Donald J. Pando, 6 Rosemont Road, Milton, Morris County, N.J. 07438

[22] Filed: Mar. 10, 1975

[21] Appl. No.: 557,112

[52] U.S. Cl............................. 325/16; 325/105; 325/118; 343/718
[51] Int. Cl.²........................................ H04B 1/04
[58] Field of Search............ 179/1 UW; D56/4 B; 312/7 R; 325/16, 28, 105, 111, 118, 119, 352, 361; 206/328, 37; 2/129; 63/1 R, 3; 343/718

[56] References Cited
UNITED STATES PATENTS

| | | | |
|---|---|---|---|
| 3,218,607 | 11/1965 | Brock et al. | 179/1 UW |
| 3,329,957 | 7/1967 | Haynes | 343/718 |
| 3,492,582 | 1/1970 | Heywood | 325/16 X |
| 3,902,118 | 8/1975 | Ikrath et al. | 325/118 |

*Primary Examiner*—Benedict V. Safourek
*Attorney, Agent, or Firm*—Anthony F. Cuoco

[57] ABSTRACT

A communications device arranged to be worn in intimate contact with the body of a user and without interference with bodily movements includes a radio transmitter and receiver for communicating with a remote station. The transmitter includes means arranged therewith and operative in conjunction with the body of the user for providing a relatively high transmitting frequency range. The device is miniaturized so as to provide predetermined transmitting and receiving circuit characteristics and is encapsulated so as to be essentially floatable, resilient and waterproof whereby it is rendered suitable outdoor activities such as sports and the like.

18 Claims, 3 Drawing Figures

COMMUNICATIONS DEVICE ARRANGED TO BE WORN IN INTIMATE CONTACT WITH THE BODY OF A USER

BACKGROUND OF THE INVENTION

1. Field of the Invention

This invention relates generally to communications devices and particularly to communications devices including radio transmitters and receivers which are worn on the body of a user for use without interference with bodily movements so as to be adaptable for outdoor use such as sports activities and the like. More particularly, this invention relates to a communications device of the type described wherein the transmitter is arranged in conjunction with the body of the user to provide a relatively high transmitting frequency range.

2. Description of the Prior Art

Outdoor activities such as water skiing, surfboard riding, hiking and the like are increasingly popular forms of sport and recreation. The need for the safety of the participant in these activities makes effective communications between the participant and a remote station which may be, for example, a towboat in a water skiing activity, imperative. Prior to the present invention there has not been an effective device for providing such communications, particularly in view of the fact that it is often necessary that the participant have free use of his hands while performing the activity. Moreover, communication devices for the purposes described have heretofore been housed in body or shoulder harnesses and have been generally cumbersome and uncomfortable to wear, and have not provided the degree of mobility required in many activities. Additionally, the circuit characteristics of these devices has not been such to provide high frequency transmission which is an asset in the type of communication described.

Typical of the prior art devices are such as described in U.S. Pat. No. 2,541,042 issued to Curtis on Feb. 13, 1951, U.S. Pat. No. 3,114,105 issued to Neumiller on Dec. 10, 1963, U.S Pat. No. 3,122,609 issued to Moore on Feb. 25, 1964, U.S. Pat. No. 3,478,344, issued to Schwitzgebel, et al on Nov. 11, 1969, U.S. Pat. No. Des. 212,850 issued to Roberts on Dec. 3, 1968 and U.S. Pat. No. 3,492,582 issued to Heywood on Jan. 27, 1970. A device disclosing transmitting circuitry and adapted to be worn in a manner similar to that of the present invention is described in U.S. Patent Application Ser. No. 157,291 filed June 28, 1971 by Donald J. Pando, invention of the present invention, and now abandoned.

SUMMARY OF THE INVENTION

This invention contemplates a communications device to be worn in intimate contact with the body of a user for communicating with a remote station and includes a radio transmitter and a microphone, and a power supply therefor, and a radio receiver and an earphone, and another power supply therefor. In the preferred embodiment of the invention the above noted elements are housed in a waterproof, floatable and resilient collar type structure which is adapted to be worn around the neck of the user for minimum interference with bodily movements. The transmitter includes a conductive wire loop which in the structure described cooperates with the body of the user for forming a capacitor which provides a relatively high transmitting frequency range. Thhe arrangement described provides an effective communications device while permitting maximum user mobility, and is therefore particularly adapted for physical activities such as sports and the like.

One object of this invention is to provide a portable communications device including radio transmitting and receiving apparatus and arranged to be worn on the body of a user for permitting maximum bodily mobility when communicating with a remote station.

Another object of this invention is to provide a communications device of the type described which is particularly useful for paticipants in physical activities such as sports and the like.

Another object of this invention is to provide a communications device of the type described which is encapsulated so as to be floatable and waterproof whereby it is impervious to damage due to environmental conditions.

Another object of this invention is to provide a portable communications device which is adapted to be worn so as to permit maximum freedom of the hands and body when using the device.

Another object of this invention is to provide a communications device of the type described which is comfortable and unhazardous to use.

Another object of this invention is to provide a device of the type described which is miniaturized for providing predetermined transmitting and receiving circuit characteristics.

Another object of this invention is to provide a device of the type described including means associated with the radio transmitter so that when the device is worn in intimate contact with the body of the user said means cooperates with the body to provide relatively high transmitting frequency characteristics.

These and other objects and features of the invention will become more apparent from the following description thereof with reference to the accompanying drawings.

DESCRIPTION OF THE INVENTION

Figure 1:
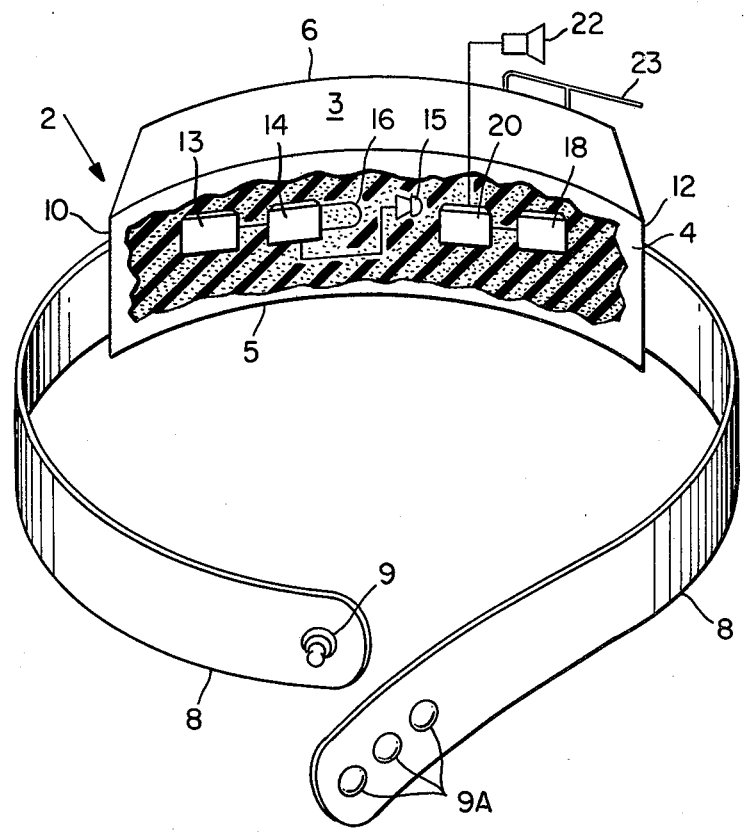
FIG. 1 is an isometric pictorial representation showing the components of the invention in block diagram form and encapsulated in a collar to be worn in intimate contact with the neck of the user.

With reference first to FIG. 1, there is shown a collar designated generally by the numeral 2. Collar 2 is of a resilient floatable, waterproof material such as for example, closed cell silicon foam rubber, and is generally oblong in shape having upper and lower edges 3 and 5, respectively, a longitudinally concave face 4, a longitudinally convex face 6 and opposite ends 10 and 12. A strap 8 is integral to and extends from concave face 4 and may be of the continuous elastic type or of the type having a buckel or snaps 9 and 9A as shown in the figure.

Collar 2 houses electronic circuitry including a power supply 13, which may be a conventional three volt battery, connected to a radio transmitter 14. A conventional type dynamic microphone 15 is connected to transmitter 14 and is disposed near face 4 so as to easily pick up voice waves when collar 2 is worn as will be described. A wire loop 16, which may have a resistance of three hundred ohms, is connected to transmitter 14 in a manner and for purposes as will be described with reference to FIG. 2.

Collar 2 further houses a power supply 18, which may also be a conventional three volt battery, connected to a radio receiver 20. A conventional type earphone device 22 is connected to receiver 20 as is an antenna 23.

The particular connections between the components shown housed in collar 2 will be more fully described and explained with reference to FIGS. 2 and 3.

In manufacturing the communications device of the invention, collar 2 is molded in the form shown to essentially encapsulate the aforenoted circuit components. It will be understood that conventional type molding processes may be used for this purpose, the same not being within the scope of this invention. Since collar 2 encapsulates the circuit elements, said elements are protected from damage due to environmental conditions, and which feature makes the invention paticularly useful in outdoor sports activities and the like.

The device of the invention is worn around the neck of the user and thus the circuit components therein, paticularly transmitter 14 and wire loop 16, are in close proximity to the body of the user for purposes which will be hereinafter described.

It will further be seen from the configuration of the invention as shown in FIG. 1, that the device may be used with little or no interference with body and hand movements of the user and, indeed, communication is affected without the use of the hands as is desirable for the purpose intended. Since collar 2 is waterproof, water soaking which may occur due to inclement weather conditions will not effect workability of the circuitry within. If the device becomes dislodged from the user and falls into the water as may be the case in water sports and the like, the floatable feature enhances recovery of the device. Since the collar is of a resilient material it is comfortable to wear and contact with the various parts of the neck and face of the user are, in effect, cushioned to prevent injury and discomfort.

Figure 2:
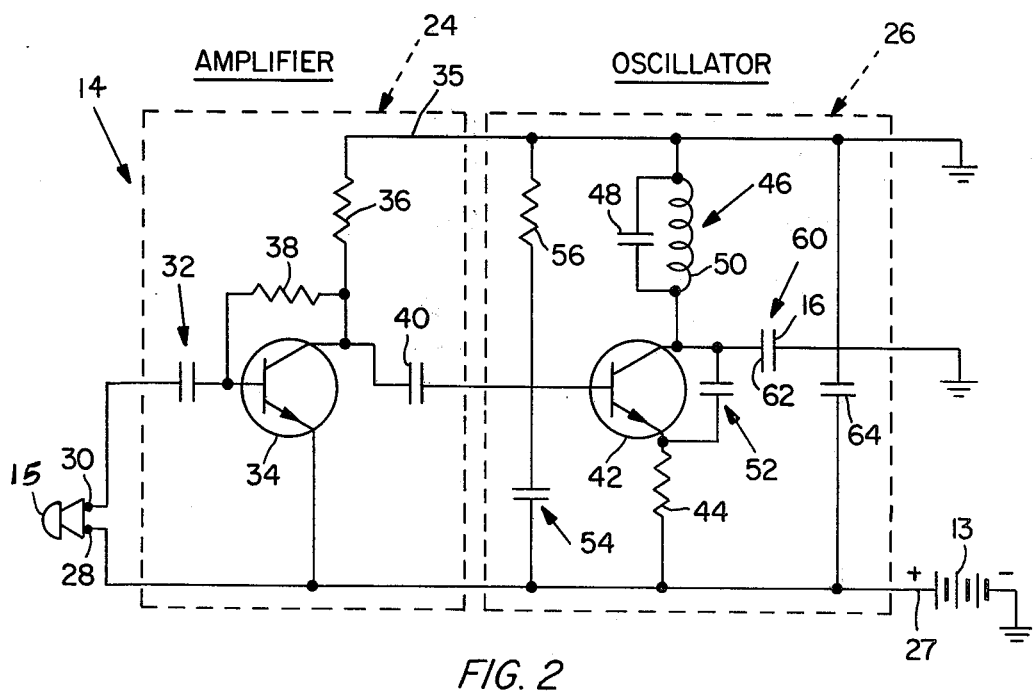
FIG. 2 is an electrical schematic diagram of a radio transmitter in accordance with the invention.

Reference is now made to FIG. 2, wherein transmitter 14 is shown in the electrical schematic form. Transmiter 14 includes an amplifier stage 24 and an oscillator stage 26. Power supply 13 has a negative grounded terminal and a positive terminal connected through a line 27 to an input terminal 28 of microphone 15. Microphone 15 has an output terminal 30 connected through a coupling capacitor 32 to the base element of a transistor 34 included in amplifier 24.

Transistor 34 includes an emitter element connected to line 27 intermediate microphone input terminal 28 and the positive terminal of battery 13 and a collector element connected through a resistor 36 to a grounded line 35. A feedback resistor 38 is connected intermediate capacitor 32 and the base element of transistor 34, and intermediate resistor 36 and the collector element of the transistor.

A coupling capacitor 40 couples the collector element of transistor 34 to the base element of a transistor 42 included in oscillator stage 26. Transistor 42 has an emitter element connected through a stabilizing resistor 44 to line 27. Transistor 42 has a collector element connected to line 35 through a tank circuit 46 including a capacitor 48 and a coil 50 connected in parallel relation.

A feedback capacitor 52 is connected to the collector and emitter elements of transistor 42. A biasing capacitor 54 and a biasing resistor 56 are serially connected across line 27 and line 35, intermediate capacitor 40 and tank circuit 46 and transistor 42 in oscillator stage 26.

Wire loop 16 forms a grounded plate of a capacitor 60. The other plate of capacitor 60, which will be further defined, is designated by the numeral 62 and is connected to the collector element of transistor 42.

It will now be understood that capacitor 60 is formed when collar 2 of the invention as shown in FIG. 1 is worn in intimate contact with the neck of the user. Wire loop 16 forms one capacitor plate while the body of the user effectively forms capacitor plate 62. Plates 16 and 62 are appropriately separated by the material of collar 2 to provide the desired capacitive action. In this respect the body of the user is, in effect, part of the transmission circuitry with the result being that transmission is achieved at a predetermined relatively high frequency range which may be from 200–500 megacycles or higher as may be desired, and which high frequency range is desirable for transmission under the conditions intended. In this connection it is noted that the collector of transistor 42 radiates an electrical field. Due to the close proximity of the body of the user to transmitter 14, the body is effectively connected to the collector through this field to provide the aforenoted results.

Figure 3:
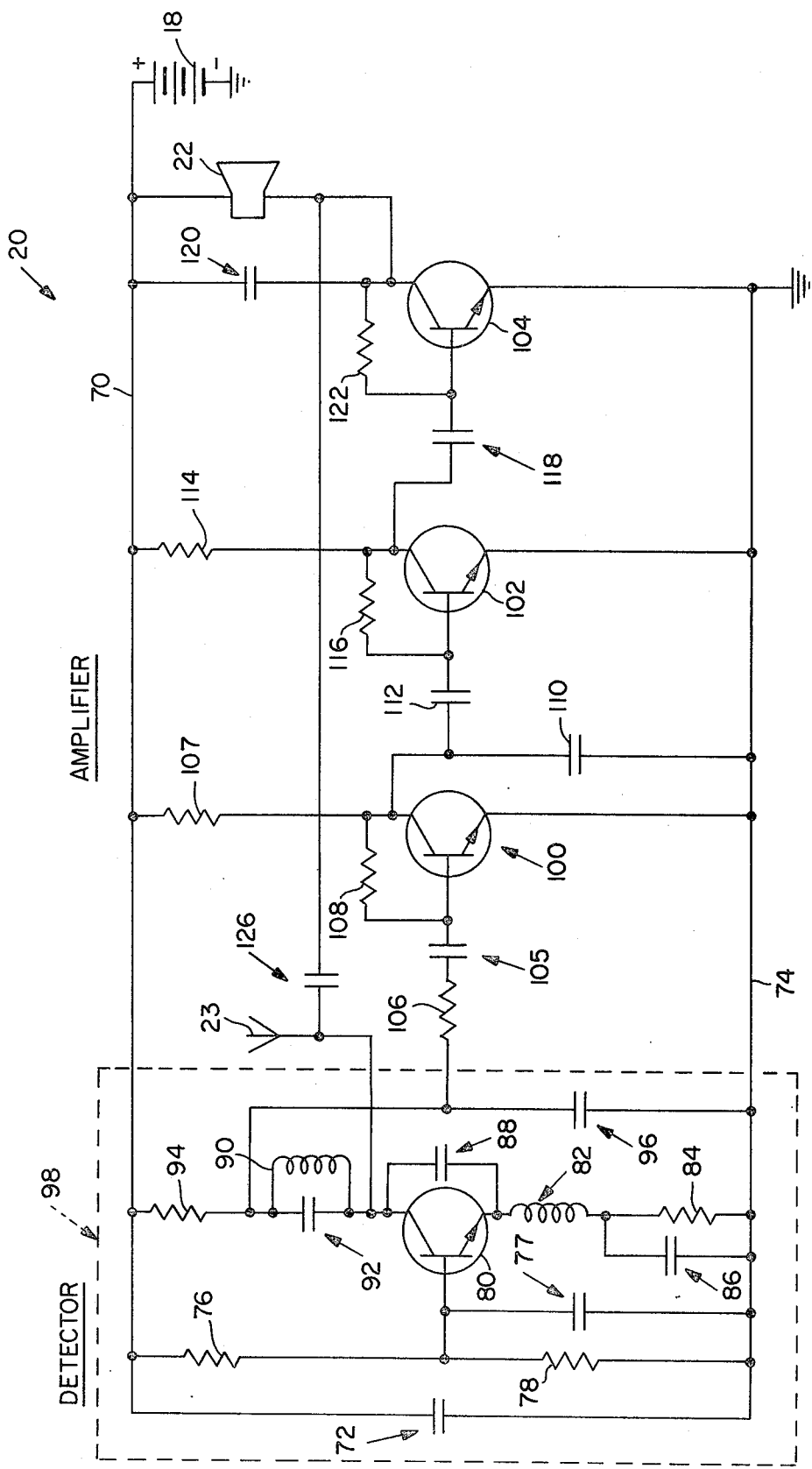
FIG. 3 is an electrical schematic diagram of a radio receiver in accordance with the invention.

Reference is now made to FIG. 3 wherein receiver 20 is shown in electrical schematic form. Power supply 18 has a grounded negaive terminal and a positive terminal connected through a line 70 to one plate of a capacitor 72. The other plate of capacitor 72 is connected through a line 74 to ground. A resistor 76 and a resistor 78 are serially connected across lines 70 and 74. A capacitor 77 has one plate connected to line 74 and another plate connected intermediate resistors 76 and 78 and connected to the base element of a transistor 80. Transistor 80 has an emitter element connected to a coil 82, and which coil is serially connected to a resistor 84 connected to line 74. A capacitor 86 is connected at a point intermediate coil 82 and resistor 84 and is connected to output line 74.

A feedback capacitor 88 is connected across the collector and emitter elements of transistor 80. The collector element of transistor 80 is connected to a coil 90, with a capacitor 92 being connected in parallel relation with coil 90. Coil 90 and capacitor 92 are connected through a resistor 94 to line 70.

A capacitor 96 is connected to a point intermediate the parallel connection of coil 90 and capacitor 92 and resistor 94, and is connected to line 74. The elements heretofore described provide a detector designated generally by the numeral 98.

Transistor 100, 102 annd 104 form a cascaded amplifier within receiver 20. Transistor 100 has a base element connected to capacitor 96 in detector 98 through a coupling resistor 106 and a capacitor 105. The emitter element of transistor 100 is connected to line 74 and the collector element is connected through a resistor 107 to line 70. A feedback resistor 108 is connected intermediate capacitor 105 and the base element of transistor 100, and connected intermediate resistor 107 and the collector element of the transistor. The collector element of transistor 100 is connected to line 74 through a capacitor 110.

The collector element of transistor 100 is connected through a coupling capacitor 112 to the base element of transistor 102. Transistor 102 has an emitter element connected to line 74 and a collector element connected through a resistor 114 to line 70. A feedback resistor 116 is connected intermediate the base element of the transistor and capacitor 112, and is connected intermediate the collector element of the transistor and resistor 114.

The collector element of transistor 102 is connected to the base element of transistor 104 through a coupling capacitor 118. Transistor 104 has an emitter element connected to line 74 and a collector element connected through a capacitor 120 to line 70. A feedback resistor 122 is connected intermediate the base element of the transistor and capacitor 118, and is connected intermediate the collector element of the transistor and capacitor 120.

Antenna 23 is connected intermediate the collector element of transistor 80 and the parallel connection of coil 90 and capacitor 92 in detector 98. Antenna 23 is coupled through a capacitor 126 to the collector element of transistor 104. Earphone 22 is connected at a point intermediate the collector element of transistor 104 and capacitor 126 and is connected to line 70.

It will now be seen from the aforenoted description of the invention that a highly sensitive communications device adapted to be worn in intimate contact with the body of the user has been disclosed, and whereby a relatively high predetermined transmitting frequency range is provided. In view of the described structural features, the device of the invention is particulaly adaptable to be used by those engaged in physical activities and the like where a high degree of mobiliy is required and radio reception and transmission must be achieved with freedom of the hands and with as little bodily incumberance as possible while accommodating a variety of environmental conditions. The packaging of the device of the invention is further designed to enhance circuit characteristics. In this regard it is to be noted that to achieve desired circuit characteristics; i.e. transmitting frequency range, transmitting and receiving sensitivity, etc., lead lengths between the various components shown in the drawing as well as the proximity of the components each to the other and to the body of the user should be optimized.

Although only one embodiment of the invention has been described and illustrated, various changes in the form and relative arrangement of the parts which will now appear obvious to one skilled in the art may be made without departing from the spirit and scope of the invention. For example, although the invention has been described as adapted to be worn as a collar around the neck of the user, other adaptations wherein the device is in intimate contact with the body of the user would work equally as well. Reference, therefore, is to be had to the appended claims for a definition of the limits of the invention.

What is claimed is:

1. A communications device adapted to be worn in intimate contact with th body of a user comprising:
    circuitry including a radio transmitter having a power supply and a microphone connected thereto, an amplifier stage including a first transistor and a first capacitor connected to the collector of the first transistor, an oscillator stage including a second transistor with the base thereof connected to the first capacitor, and a radio receiver having a power supply, an antenna and an earphone connected thereto;
    a collar for housing the circuitry and including a strap for supporting the collar about the neck of the user so as to be in intimate contact therewith, said collar and circuitry housed within the collar arranged for permitting communication with a remote station while maintaining maximum body mobility;
    said collar being generally oblong in shape and including a longitudinally convex face and a longitudinally concave face adjacent the neck, substantially parallel upper and lower edges and substantially parallel opposite ends separating the convex and concave faces, and the strap extending from the opposite ends and being integral with the concave face; and
    means included in the transmitter and operative with the body of the user when the collar is worn in intimate contact with the neck for providing a predetermined transmission frequency range and including a grounded conductor for providing one plate of a second capacitor, with the body of the user being effectively connected to the collector of the second transistor for providing the other plate of the second capacitor.

2. A communications device as described by claim 1, wherein:
    the collector of the second transistor radiates an electrical field; and
    the body of the user is effectively connected to the collector through the electrical field.

3. A communications device as described by claim 1 including:
    a tank circuit having a third capacitor and a coil connected in parallel relation; and
    the tank circuit connected to the collector of the second transistor and connected to ground.

4. A communications device as described by claim 1, including:
    a feedback capacitor connected to the collector and to the emitter of the second transistor.

5. A communications device as described by claim 1, wherein:
    the emitter of the second transistor is connected to the transmitter power supply.

6. A communications device as described by claim 1, including:
    a feedback resistor connected to the collector and to the base of th first transistor.

7. A communications device as described by claim 1, wherein:
    the microphone is connected to the transmitter power supply, and is connected through a coupling capacitor to the base of the first transistor.

8. A communications device as described by claim 1, wherein the receiver includes:
    a detector having a first transistor, with the collector thereof connected to the receiver power supply and the emitter connected to ground; and
    a cascaded amplifier having second, third and fourth transistors, each of said transistors having the collector thereof connected to the receiver power supply and the emitter connected to ground.

9. A communications device as described by claim 8, wherein:

each of the second, third and fourth transistors has a feedback resistor connected to the collector and base thereof.

10. A communications device as described by claim 8, including:
a first capacitor for coupling the collector of the second transistor to the base of the third transistor and a second capacitor for coupling the collector of the third transistor to the base of the fourth transistor.

11. A communications device as described by claim 8, wherein:
the earphone is connected to the collector of the fourth transistor and is connected to the receiver power supply.

12. A communications device as described by claim 8, including:
a capacitor for coupling the collector of the second transistor to ground.

13. A communications device as described by claim 8, including circuitry for connecting the emitter of the first transistor to ground, said circuitry including:
a coil connected to said emitter, and a capacitor and a resistor connected in parallel relation to the first mentioned coil and connected to ground.

14. A communications device as described by claim 8 including circuitry for connecting the collector of the first transistor to the receiver power supply, said circuitry including:
a coil and a capacitor and connected in parallel arrangement to the collector, and a resistor connected to the parallel coil and capacitor arrangement and connected to the power supply; and
the antenna connected intermediate the collector of the first transistor and the parallel coil and capacitor arrangement, and connected through a coupling capacitor to a point intermediate the collector of the fourth transistor and the earphone.

15. A communications device as described by claim 14, including:
another capacitor connected intermediate the parallel coil and capacitor arrangement and the receiver power supply and connected to ground.

16. A communications device as described by claim 8, including:
a feedback capacitor connected to the collector and emitter of the first transistor.

17. A communications device as described by claim 8, including:
a capacitor for connecting the base of the first transistor to ground;
first and second resistors serially connected across the receiver power supply;
the base of the first transistor connected intermediate the first and second resistors; and
another capacitor connected in parallel with the first transistor.

18. A communications device adapted to be worn in intimate contact with the body of a user comprising:
circuitry including a radio transmitter having a power supply and a microphone connected thereto, an amplifier stage including a first transistor and a first capacitor connected to the collector of the first transistor, an oscillator stage including a second transistor with the base thereof connected to the first capacitor, and a radio receiver having a power supply, an antenna and an earphone connected thereto;
a housing for said circuitry and including means for supporting said housing in intimate contact with the body of a user; and
means included in the transmitter and operative with the body of the user when the housing is worn in intimate contact therewith for providing a predetermined frequency transmitting range and including a grounded conductor for providing one plate of a second capacitor, with the body of the user being effectively connected to the collector of the second transistor for providing the other plate of the second capacitor.

* * * * *